United States Patent
Palmlöf et al.

(10) Patent No.: US 8,519,034 B2
(45) Date of Patent: Aug. 27, 2013

(54) POLYETHYLENE COMPOSITION FOR WATER PIPES WITH IMPROVED CHLORINE RESISTANCE

(75) Inventors: Magnus Palmlöf, Västra Frölunda (SE); Jeroen Oderkerk, Stenungsund (SE)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/120,929

(22) PCT Filed: Dec. 17, 2009

(86) PCT No.: PCT/EP2009/009096
§ 371 (c)(1), (2), (4) Date: May 15, 2011

(87) PCT Pub. No.: WO2010/072375
PCT Pub. Date: Jul. 1, 2010

(65) Prior Publication Data
US 2011/0237716 A1 Sep. 29, 2011

(30) Foreign Application Priority Data
Dec. 22, 2008 (EP) ..................... 08022281

(51) Int. Cl.
C08K 5/15 (2006.01)
C08K 5/1545 (2006.01)
C08K 5/13 (2006.01)
C07C 37/14 (2006.01)
C09G 1/04 (2006.01)

(52) U.S. Cl.
USPC ........................ 524/110; 524/326; 524/340

(58) Field of Classification Search
USPC ........................ 524/110, 326, 340
See application file for complete search history.

(56) References Cited

U.S. PATENT DOCUMENTS

| 4,532,165 | A | 7/1985 | Hashimoto et al. | |
| 5,221,715 | A * | 6/1993 | Kagawa et al. | 525/240 |
| 2008/0194766 | A1 * | 8/2008 | Neri et al. | 525/240 |

FOREIGN PATENT DOCUMENTS

| EP | 0 124 664 | 5/1983 |
| EP | 0 739 937 | 5/2001 |
| WO | WO 02/102891 | 12/2002 |
| WO | WO 03/064511 | 8/2003 |
| WO | WO 2004/024810 | 3/2004 |
| WO | WO 2005/056657 | 6/2005 |

OTHER PUBLICATIONS

International Preliminary Report on Patentability mailed Mar. 31, 2011 for International application No. PCT/EP2009/009096.
International Search Report mailed Mar. 30, 2010 for International application No. PCT/EP2009/009096.
Written Opinion mailed Mar. 30, 2010 for International application No. PCT/EP2009/009096.
Response to Written Opinion mailed Sep. 1, 2010 for International application No. PCT/EP2009/009096.
Written Opinion of the International Preliminary Examining Authority mailed Dec. 29, 2010 for International application No. PCT/EP2009/009096.
Reply to Written Opinion of the International Preliminary Examining Authority mailed Mar. 1, 2011 for International application No. PCT/EP2009/009096.

* cited by examiner

Primary Examiner — Peter F Godenschwager
Assistant Examiner — Angela C Scott
(74) Attorney, Agent, or Firm — Fay Sharpe LLP

(57) ABSTRACT

The present invention is directed to the use of compound (A) and compound (B) in a polyethylene composition for increasing the lifetime of a pipe made of said polyethylene composition which is in permanent contact with chlorinated water, wherein compound (A) has the following formula (I): wherein—$R^6$, $R^7$ and $R^8$ independently are non-substituted or substituted aliphatic or aromatic hydrocarbyl radicals which may comprise OH-groups, $X^1$, $X^2$, and $X^3$ independently are H or OH, with the proviso that at least one of $X^1$, $X^2$, and $X^3$ is OH, and the entire molecule does not comprise an ester group; wherein compound (B) has the following formula (II): wherein $R^1$, $R^2$, $R^3$, $R^4$ and $R^5$ independently are H, or non-substituted or substituted aliphatic or aromatic hydrocarbyl radicals which may comprise heteroatoms, and wherein the base resin of said polyethylene composition consists of a polyethylene homo- or copolymer.

8 Claims, No Drawings

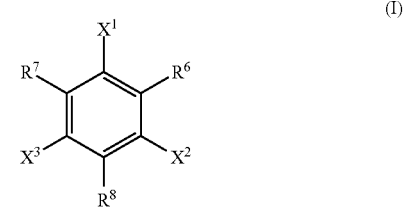

(I)

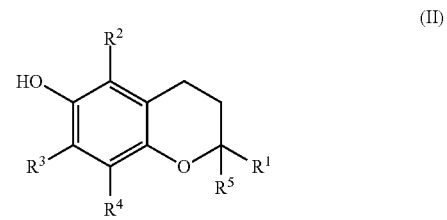

(II)

POLYETHYLENE COMPOSITION FOR WATER PIPES WITH IMPROVED CHLORINE RESISTANCE

The present invention relates to a polyethylene composition with good resistance to degradation caused by chlorinated water, particularly to the use of a combination of particular types of antioxidants for increasing the resistance of a polyethylene composition against degradation caused by contact with chlorinated water.

Recent progress in the manufacturing and processing of polymers has led to the application of plastics in virtually every aspect of modern day life. However, polymeric compounds are prone to aging under the effects of oxidants, light and heat. This results in a loss of strength, stiffness and flexibility, discoloration and scratching as well as loss of gloss.

It is well-known in the art that antioxidants and light stabilizers can prevent or at least reduce these effects. Several types of additives are added to polymers to protect them during processing and to achieve the desired end-use properties. Additives are generally divided in stabilizers and modifiers. Stabilizers, like antioxidants, traditionally and currently used comprise sterically hindered phenolics, aromatic amines, hindered amine stabilizers, organo-phosphites/phosphonites and thioethers. However, appropriate combinations of stabilizers have to be carefully selected, depending on the desired final properties, the polymeric article should have.

WO 2004/024810 is directed to stabilization of polymeric materials and discloses a vast multitude of stabilizers and different kinds of polymeric material.

Besides many other applications, polyolefins are used for the preparation of pipes for drinking water distribution systems. In many cases chlorine is added to the water. Hence, chlorinated water is in permanent contact with the pipe material. Due to the permanent contact to the inner pipe surface, deterioration of the polyolefin composition is caused.

WO 03/064511 discloses different types of antioxidants for increasing the lifetime of a polyolefin pipe which is in permanent contact with chlorinated water, namely an epoxidized fatty acid or ester thereof and/or an organotin compound.

WO 2005/056657 discloses stabilized polyethylene materials suitable for pipes with advantageously balanced thermal, mechanical and processing properties which are maintained in chlorinated water environments. The polyethylene compositions comprise members of two different classes of hindered phenolic antioxidants and preferably further antioxidants as phosphites and phosphonites such as tris(2,4-di-tert-butylphenyl)phosphate.

However, there is still a need for improved polyethylene compositions suitable for water pipe applications, particularly for polyethylene compositions having an increased lifetime in contact to chlorinated water.

Thus, it is an object of the present invention to provide particular types of additives for addition to polyethylene compositions for pipes which additives help to increase the lifetime of a polyethylene pipe which is in permanent contact with chlorinated water.

The present invention is based on the finding that the object of the invention can be achieved, if the polyethylene composition comprises two specific types of additives.

Therefore, the present invention relates to the use of compound (A) and compound (B) in a polyethylene composition for increasing the lifetime of a pipe made of said polyethylene composition which is in permanent contact with chlorinated water, wherein compound (A) has the following formula (I):

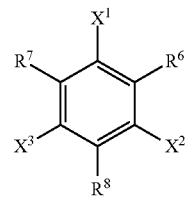

wherein
$R^6$, $R^7$ and $R^8$ independently are non-substituted or substituted aliphatic or aromatic hydrocarbyl radicals which may comprise OH-groups,
$X^1$, $X^2$, and $X^3$ independently are H or OH, with the proviso that at least one of $X^1$, $X^2$ and $X^3$ is OH, and
the entire molecule does not comprise an ester group;
wherein compound (B) has the following formula (II):

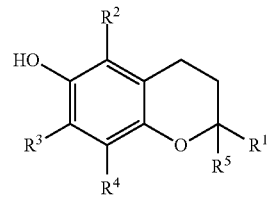

wherein $R^1$, $R^2$, $R^3$, $R^4$ and $R^5$ independently are H, or non-substituted or substituted aliphatic or aromatic hydrocarbyl radicals which may comprise heteroatoms; and
wherein the base resin of said polyethylene composition consists of a polyethylene homo- or copolymer.

Pipes made of a polyethylene composition comprising the inventive two compounds (A) and (B) show an increased lifetime in contact with chlorinated water which can be seen from the OIT test results.

In compound (A) according to formula (I) residues $R^6$, $R^7$ and $R^8$ independently are non-substituted or substituted aliphatic or aromatic hydrocarbyl radicals which may comprise OH-groups. This means that apart from OH-groups no further heteroatoms are present in $R^6$, $R^7$ and $R^8$, so that phenolic stabilizer (A) is e.g. free of ester groups, amide groups and groups containing phosphorus.

Preferably, $R^6$, $R^7$ and $R^8$, which independently are non-substituted or substituted aliphatic or aromatic, more preferably aliphatic, hydrocarbyl radicals which may comprise OH-groups, have from 2 to 200 carbon atoms.

Preferably, $R^6$ and $R^7$ independently have from 2 to 20 carbon atoms, more preferably from 3 to 10 carbon atoms.

Furthermore, it is preferred that $R^6$ and/or $R^7$, more preferably $R^6$ and $R^7$, are aliphatic hydrocarbyl groups with at least 3 carbon atoms which have a branch at the second carbon atom, and most preferably $R^6$ and/or $R^7$, more preferably $R^6$ and $R^7$, are tert.butyl groups.

Preferably, $R^8$ has from 20 to 100 carbon atoms, more preferably has from 30 to 70 carbon atoms.

Furthermore, it is preferred that $R^8$ includes one or more phenyl residues.

Still further, it is preferred that $R^8$ includes one or more hydroxyphenyl residues.

In a still more preferred embodiment, $R^8$ is a 2,4,6-trimethyl-3,5-di-(3,5-di-tert. butyl-4-hydroxybenzyl)benzene residue.

Preferably, in compound (A) of formula (I) $X^1$ is OH, and most preferably $X^1$ is OH and $X^2$ and $X^3$ are H.

In a particular preferred embodiment compound (A) comprises, still more preferably consists of 1,3,5-Tri-methyl-2,4,6-tris-(3,5-di-tert. butyl-4-hydroxybenzyl)benzene (Irganox 1330).

The heteroatoms which may be present in the non-substituted or substituted aliphatic or aromatic hydrocarbyl radicals $R^1$, $R^2$, $R^3$, $R^4$ and/or $R^5$ of antioxidant (B) according to formula (I) may be oxygen, sulphur, nitrogen, phosphorus or the like. It is, however, preferred that $R^1$, $R^2$, $R^3$, $R^4$ or $R^5$, more preferred $R^1$, $R^2$, $R^3$, $R^4$ and $R^5$, do not comprise heteroatoms, i.e. are non-substituted or substituted aliphatic or aromatic hydrocarbyl radicals only, or, as mentioned, H.

Furthermore, preferably $R^2$, $R^3$, $R^4$ or $R^5$, more preferably $R^2$, $R^3$, $R^4$ and $R^5$, are H, or saturated aliphatic hydrocarbyl radicals comprising from 1 to 5 carbon atoms, and still more preferably $R^2$, $R^3$, $R^4$ or $R^5$, more preferably $R^2$, $R^3$, $R^4$ and $R^5$, are H, or methyl groups.

Furthermore, preferably $R^5$ is a methyl group, regardless of the nature of the other residues $R^2$ to $R^4$.

In an especially preferred embodiment, $R^4$ and $R^5$ are methyl groups, and $R^2$ and $R^3$ are H, or methyl groups.

Most preferably, $R^2$, $R^3$, $R^4$ and $R^5$ are all methyl groups.

Still further, preferably $R^1$ is a non-substituted or substituted aliphatic or aromatic hydrocarbyl radical containing from 5 to 50 carbon atoms, more preferably $R^1$ is a non-substituted or substituted aliphatic hydrocarbyl radical containing from 5 to 50, more preferably from 10 to 30, carbon atoms, and most preferably $R^1$ is a 4,8,12-trimethyl-tridecyl group.

Still more preferred, antioxidant (B) is 2,5,7,8-Tetramethyl-2-(4',8',12'-trimethyltridecyl)chroman-6-ol (Vitamin E).

In a preferred embodiment of the present invention only one compound of formula (I) is used together with only one compound of formula (II).

The concentration of compound (A) in the polyethylene composition is preferably 5000 ppm or less, more preferably 4400 ppm or less, still more preferably 3900 ppm or less, based on the total composition.

The concentration of compound (A) in the polyethylene composition is preferably at least 1000 ppm, more preferably at least 2800 ppm, still more preferably at least 3300 ppm, based on the total composition.

The concentration of compound (B) in the polyethylene composition is preferably 1500 ppm or less, more preferably 1100 ppm or less, still more preferably 700 ppm or less, based on the total composition.

The concentration of compound (B) in the polyethylene composition is preferably at least 250 ppm, more preferably at least 300 ppm, still more preferably at least 350 ppm, based on the total composition.

Preferably, the sum of concentration of compounds (A) and (B) is between 2500 and 6500 ppm, more preferably between 3500 and 5000 ppm.

Preferably, the increased lifetime of a pipe is shown by an oxygen induction time of at least 50% of the unexposed pipe after exposure to chlorinated water for 3 weeks and when the sample is taken from the middle of a 2 mm thick pipe. More preferably, the oxygen induction time is at least 60% of the unexposed pipe, still more preferably at least 70% of the unexposed pipe, under the same conditions.

Preferably, the increased lifetime of a pipe is shown by an oxygen induction time of at least 30% of the unexposed pipe after exposure to chlorinated water for 6 weeks and when the sample is taken from the middle of a 2 mm thick pipe. More preferably, the oxygen induction time is at least 40% of the unexposed pipe, under the same conditions.

The polyolefin part of said polyethylene composition (socalled base resin) consists of a polyethylene homo- or copolymer.

The polyethylene composition may be any polyethylene composition which is suitable for pipe applications, preferably such polyethylene compositions which can be extruded into pipes.

The base resin of said polyethylene composition may be any homo- or copolymer of ethylene, still more preferably a homo- or copolymer of ethylene wherein the comonomers are alpha-olefins having between 3 and 20 carbon atoms.

Preferably the base resin is a multimodal, more preferably bimodal, polyethylene homo- or copolymer. This means that the polyethylene base resin comprises two (bimodal) or more (multimodal) polyethylene fractions with different weight average molecular weight resulting in bimodal or multimodal molecular weight distribution curve, i.e. the graph of the polymer weight fraction as function of its molecular weight will show two or more maxima or at least be distinctly broadened in comparison with the curves for the individual (unimodal) fractions. Such resins are described in EP 0 739 937 and WO 02/102891.

The base resin has a density of preferably between 925 to 965 kg/m$^3$. Still further, the base resin preferably has a melt flow rate of between 0.05 to 5 g/10 min.

Particular preferred are polyethylene compositions which are able to be crosslinked.

According to a preferred embodiment of the present invention, the inventive combination of compounds (A) and (B) is used in polyethylene compositions which are crosslinked after extrusion of the polyethylene composition to a pipe.

Preferably, the crosslinking is performed by irradiation.

In addition to the inventive compounds (A) and (B) the polyethylene composition may comprise further additives, i.e. stabilizers and modifiers. Typical stabilizers are antioxidants, typical modifiers are anti-static and anti-fogging agents, acid scavengers, blowing agents, lubricants, nucleating agents, slip and anti-blocking agents, as well as fillers, flame retardants and cross-linkers. The polyethylene composition may also comprise pigments.

Pipes are produced from the polyethylene composition as known in the art, e.g. by extrusion.

Measurement Methods a) Oxygen Induction Time, OIT

The OIT test is performed according to ASTM D3895, and uses a Differential Scanning calorimeter (DSC). A round sample with a diameter of 3 mm and a weight of 10 mg of the material to be tested is introduced into the DSC at room temperature, and the sample is heated to 200° C. under a nitrogen atmosphere. As soon as 200° C. is reached the cell is maintained in an isothermal condition, and the gas is changed from nitrogen to oxygen. The flow rate of the oxygen is maintained at 50 cm$^3$/min. Under these conditions the stabilizer is consumed over time until it is totally depleted. At this point the polymer sample degrades or oxidizes liberating additional heat (exotherm reaction). The time it takes for this exotherm reaction to appear from the time that the oxygen is introduced is reported as the OIT time, and is a measure of the thermal stability of the material.

Double samples of each condition are measured, and the mean value is calculated.

b) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$) or 21.6 kg ($MFR_{21}$).

EXAMPLES

The compositions prepared for examples 1 and 2 are shown in Table 1.

The base resin used is a unimodal polyethylene with an $MFR_{21}$ of 10 g/10 min, density of 944 kg/m³ and 1.3 mole % 1-butene as comonomer.

Irganox 1330 is 1,3,5-Tri-methyl-2,4,6-tris-(3,5-di-tert. butyl-4-hydroxybenzyl)benzene (CAS-no. 1709-70-2), commercially available from Ciba Specialty Chemicals.

Vitamin E is 2,5,7,8-tetramethyl-2(4'8'12'-trimethyldecyl) chroman-6-ol (Irganox E 201™, CAS-no. 10191-41-0) commercially available from Ciba Speciality Chemicals.

The compositions where prepared by mixing in a Buss Compounding machine and pellets were received therefrom.

Pipe extrusion was carried out in a Battenfeld extruder using a standard PE screw. Melt temperature was in the range 200 to 230° C. Pipe dimensions were 16×2 mm (OD×S). Irradiation of pipes was carried out by electron beam at room temperature in air using a dose of 160 kGy or 190 kGy. One Gy corresponds to an energy absorption of 1 Joule/kg.

The degree of crosslinking XL % was measured by decaline extraction (Measured according to ASTM D 2765-01, Method A).

The pipes were exposed to water at 90° C. containing 9 ppm free chlorine at a pH of 6.5. The OIT was measured for unexposed pipes and after different exposure times (3 weeks and 6 weeks).

The samples were taken from the outer surface of the pipe and from the middle of the pipe wall, one mm from the outer surfaces. The OIT of the unexposed pipes are set to 100, and the OIT of the exposed pipes are recalculated using the same factor as obtained for the measured time of the unexposed pipe divided by 100. The results are shown in Table 2.

Example 1 is according to the invention, Examples 2 is a comparative example.

TABLE 1

| | Example 1 | Example 2 |
|---|---|---|
| base polymer/wt % | 99.59 | 99.64 |
| Irganox 1330/ppm | 3600 | 3600 |
| Vitamin E/ppm | 500 | — |

TABLE 2 relative OIT values dependent on exposure time and sample.

| | unexposed | 3 weeks, outer surface | 3 weeks, middle of pipe wall | 6 weeks, outer surface | 6 weeks, middle of pipe wall |
|---|---|---|---|---|---|
| Example 1 | 100 | 21 | 81 | 12 | 51 |
| Example 2 | 100 | 12 | 45 | 8 | 21 |

The invention claimed is:

1. A method for increasing the lifetime of a pipe made of a polyethylene composition which is in permanent contact with chlorinated water comprising using only two antioxidants in said polyethylene composition, one antioxidant being compound (A) and the other antioxidant being compound (B), wherein compound (A) has the following formula (I):

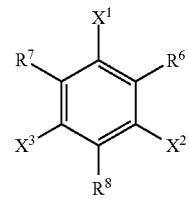

wherein
$R^6$, $R^7$ and $R^8$ independently are non-substituted or substituted aliphatic or aromatic hydrocarbyl radicals which may comprise OH-groups,
$X^1$, $X^2$, and $X^3$ independently are H or OH, with the proviso that at least one of $X^1$, $X^2$ and $X^3$ is OH, and the entire molecule does not comprise an ester group;
wherein compound (B) has the following formula (II):

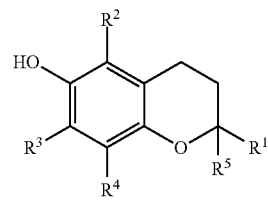

wherein $R^1$, $R^2$, $R^3$, $R^4$ and $R^5$ independently are H, or non-substituted or substituted aliphatic or aromatic hydrocarbyl radicals which may comprise heteroatoms,
wherein the base resin of said polyethylene composition consists of a polyethylene homo- or copolymer;
wherein the concentration of compound (A) in the polyethylene composition is from 3300 to 3900 ppm; and
wherein the concentration of compound (B) in the polyethylene composition is from 350 to 700 ppm.

2. A method according to claim 1, wherein the increased lifetime of the pipe is shown by an oxygen induction time of at least 50% of the unexposed pipe after exposure to chlorinated water for 3 weeks and when the sample is taken from the middle of a 2 mm thick pipe.

3. A method according to claim 1, wherein the increased lifetime of the pipe is shown by an oxygen induction time of at least 30% of the unexposed pipe after exposure to chlorinated water for 6 weeks and when the sample is taken from the middle of a 2 mm thick pipe.

4. The method of claim 1, wherein compound (A) is 1,3, 5-trimethyl-2,4,6-tris-(3,5-di-tert-butyl-4-hydroxybenzyl) benzene and compound (B) is Vitamin E.

5. The method of claim 1, wherein the polyethylene composition is crosslinked.

6. The method of claim 1, wherein the base resin of the polyethylene composition consists of a polyethylene homopolymer.

7. The method of claim 1, wherein the base resin of the polyethylene composition consists of a polyethylene copolymer.

8. The method of claim 1, wherein the ratio of compound (A) to compound (B) is 35:6, measured in ppm:ppm.

* * * * *